US00RE49069E

(19) United States
(12) Reissued Patent
Taylor, Jr. et al.

(10) Patent Number: US RE49,069 E
(45) Date of Reissued Patent: *May 10, 2022

(54) SIDE VIEWABLE LIGHTED BEZEL FOR A DISPLAY DEVICE

(71) Applicant: Johnson Controls Technology Company, Auburn Hills, MI (US)

(72) Inventors: John Robert Taylor, Jr., Dacula, GA (US); John Michael Reiszl, Grayson, GA (US)

(73) Assignee: Johnson Controls Technology Company, Auburn Hills, MI (US)

( * ) Notice: This patent is subject to a terminal disclaimer.

(21) Appl. No.: 16/505,276

(22) Filed: Jul. 8, 2019

Related U.S. Patent Documents

Reissue of:
(64) Patent No.: 9,824,549
Issued: Nov. 21, 2017
Appl. No.: 14/104,669
Filed: Dec. 12, 2013

U.S. Applications:
(60) Provisional application No. 61/736,218, filed on Dec. 12, 2012.

(51) Int. Cl.
*G08B 5/36* (2006.01)
*G08B 5/38* (2006.01)
*G08B 21/00* (2006.01)

(52) U.S. Cl.
CPC ..... *G08B 5/36* (2013.01); *G08B 5/38* (2013.01); *G08B 21/00* (2013.01)

(58) Field of Classification Search
CPC ..... G08B 21/00; G08B 5/38; G08B 5/36
See application file for complete search history.

(56) References Cited

U.S. PATENT DOCUMENTS

| | | | | |
|---|---|---|---|---|
| 4,084,438 | A | 4/1978 | Lee et al. | |
| 4,611,265 | A | 9/1986 | Davis | |
| 4,821,709 | A | 4/1989 | Jensen | |
| 5,357,242 | A | 10/1994 | Morgano et al. | |
| 5,730,765 | A | 3/1998 | Henry et al. | |
| 6,193,395 | B1 * | 2/2001 | Logan | F21S 9/022 362/269 |
| 6,693,514 | B2 * | 2/2004 | Perea, Jr. | G08B 5/36 340/286.07 |

(Continued)

OTHER PUBLICATIONS

Johnson Controls Technology Company's Complaint for Patent Infringement. Case 1:20-cv-03692-LMM. United States District Court for the Northern District of Georgia. Filed Sep. 9, 2020. 23 pages.

(Continued)

*Primary Examiner* — Catherine M Tarae
(74) *Attorney, Agent, or Firm* — Foley & Lardner LLP

(57) ABSTRACT

A monitor display unit mounted on a surface and in electronic communication with a system or device to be monitored, comprising a face plate, a back plate having at least a portion of a side edge being translucent or transparent, a logic controller, and at least one light-emitting device in electronic communication with the controller. Actuation of the light-emitting device causes light to pass through the side edge of the back plate, thereby being visible to a viewer at an angle that can be generally parallel to the surface on which the display unit is mounted.

84 Claims, 9 Drawing Sheets

(Amended)

(56) References Cited

U.S. PATENT DOCUMENTS 6,771,172 B1 * 8/2004 Robinson ..... A61B 5/369 340/573.1
6,789,429 B2 9/2004 Pinto et al.
6,827,465 B2 * 12/2004 Shemitz ..... A47F 11/10 362/125
7,012,544 B2 * 3/2006 Cunningham ..... G09F 13/04 340/815.73
7,348,925 B2 * 3/2008 Noro ..... H01Q 9/0407 343/700 MS
7,451,917 B2 * 11/2008 McCall ..... G06Q 20/00 235/379
7,636,365 B2 12/2009 Chang et al.
7,665,874 B2 * 2/2010 Chadwell ..... G09F 13/06 40/448
7,667,163 B2 2/2010 Ashworth et al.
8,182,106 B2 * 5/2012 Shin ..... G09G 3/3426 362/97.3
8,275,918 B2 * 9/2012 Bourbeau ..... H05K 5/0017 710/62
8,344,860 B2 1/2013 Collins et al.
8,400,290 B2 3/2013 Baker, Jr.
8,416,084 B2 * 4/2013 Beltmann ..... A61B 5/6889 340/573.1
8,419,236 B2 * 4/2013 Fisher ..... F21V 33/0012 362/367
8,689,376 B2 4/2014 Becker et al.
8,893,555 B2 11/2014 Bourbeau et al.
9,046,414 B2 * 6/2015 Fadell ..... G06V 40/103
9,113,156 B2 * 8/2015 Sugiyama ..... H04N 13/349
9,125,255 B2 * 9/2015 Ramer ..... G08B 5/36
9,131,904 B2 * 9/2015 Qualey ..... A61B 5/742
9,304,366 B2 * 4/2016 Kubo ..... G02F 1/13454
9,453,340 B2 * 9/2016 Van Herpen ..... F21V 23/0485
9,618,185 B2 * 4/2017 Ricci ..... F21V 21/14
10,119,712 B2 11/2018 Grosshart et al.
2003/0079387 A1 * 5/2003 Derose ..... G02B 6/0083 40/544
2005/0012633 A1 * 1/2005 Yoon ..... F21V 33/0076 340/693.5
2005/0219860 A1 * 10/2005 Schexnaider ..... F21S 8/04 362/601
2007/0121334 A1 * 5/2007 Bourdin ..... F21S 48/2237 362/459
2007/0138496 A1 * 6/2007 Zhao ..... H01L 33/483 257/98
2007/0229249 A1 10/2007 McNeal et al.
2010/0073172 A1 * 3/2010 Lax ..... G08B 17/10 340/630
2010/0212198 A1 * 8/2010 Matsunaga ..... F21V 33/006 40/564
2010/0327766 A1 * 12/2010 Recker ..... H02J 9/02 315/291
2011/0133655 A1 * 6/2011 Recker ..... H02J 9/02 315/159
2011/0225859 A1 * 9/2011 Safavi ..... G02F 1/133308 40/448
2011/0254450 A1 * 10/2011 Bergholz ..... F21V 19/0015 315/121
2012/0007804 A1 * 1/2012 Morrison ..... G06F 3/005 345/158
2013/0297212 A1 * 11/2013 Ramer ..... H05B 47/175 702/1

OTHER PUBLICATIONS

Exhibit 10—Defendants' Invalidity Contentions for U.S. Pat. No. 9,824,549, 12 pages.
1:20-cv-03692-LMM, *Johnson Controls* vs. *Price Industries*, Defendants' Second Supplemental Invalidity Contentions, Aug. 30, 2021, 61 pages.
1:20-cv-03692-LMM, *Johnson Controls* vs. *Price Industries*, Exhibit 26, Triatek, "FMS-1650 Room Pressure Controller Data Sheet," www.triatek.com, Jun. 11, 2018, 2 pages.
1:20-cv-03692-LMM, *Johnson Controls* vs. *Price Industries*, Exhibit 27, Triatek, "Triatek 1650 Series," www.triatek.com, Oct. 5, 2011, 3 pages.
1:20-cv-03692-LMM, *Johnson Controls* vs. *Price Industries*, Exhibit 28, Triatek, "FMS-1650 Installation Manual Version: 12.22.11," Dec. 22, 2011, 65 pages.
1:20-cv-03692-LMM, *Johnson Controls* vs. *Price Industries*, Exhibit 29, Triatek, "FMS-1650-LITE Installation & Wiring Manual Version: 12.7.11," www.triatek.com, Dec. 7, 2011, 19 pages.
1:20-cv-03692-LMM, *Johnson Controls* vs. *Price Industries*, Exhibit 30, Triatek, "FMS-1650 Programmer's Guide," www.triatek.com, Dec. 12, 2011, 81 pages.
1:20-cv-03692-LMM, *Johnson Controls* vs. *Price Industries*, Exhibit 31, U.S. Pat. No. 7,880,637-B2, 14 pages.
1:20-cv-03692-LMM, *Johnson Controls* vs. *Price Industries*, Exhibit 32, RKI Instruments, "GX-2009, Smallest Four Gas Confined Space Monitor," https://web.archive.org/web/20110208211429/http://www.rkiinstruments.com/pages/gx2009.htm, Feb. 8, 2011, retrieved from internet Apr. 16, 2021, 72 pages.
1:20-cv-03692-LMM, *Johnson Controls* vs. *Price Industries*, Exhibit 33, US 2007/0227867-A1, 13 pages.
1:20-cv-03692-LMM, *Johnson Controls* vs. *Price Industries*, Exhibit 34, US 2006/0267788-A1, 32 pages.
1:20-cv-03692-LMM, *Johnson Controls* vs. *Price Industries*, Exhibit 35, U.S. Pat. No. 6,350,039-B1, 8 pages.
1:20-cv-03692-LMM, *Johnson Controls* vs. *Price Industries*, Exhibit 36, U.S. Pat. No. 6,507,159-B2, 16 pages.
1:20-cv-03692-LMM, *Johnson Controls* vs. *Price Industries*, Exhibit 37, U.S. Pat. No. 6,510,995-B2, 10 pages.
1:20-cv-03692-LMM, *Johnson Controls* vs. *Price Industries*, Exhibit 38, U.S. Pat. No. 5,931,570-A, 19 pages.
1:20-cv-03692-LMM, *Johnson Controls* vs. *Price Industries*, Exhibit 39, U.S. Pat. No. 4,954,931, 5 pages.
1:20-cv-03692-LMM, *Johnson Controls* vs. *Price Industries*, Exhibit 40, Defendants' Letter Regarding Second Supplemental Invalidity Contentions, Aug. 30, 2021, 2 pages.

* cited by examiner

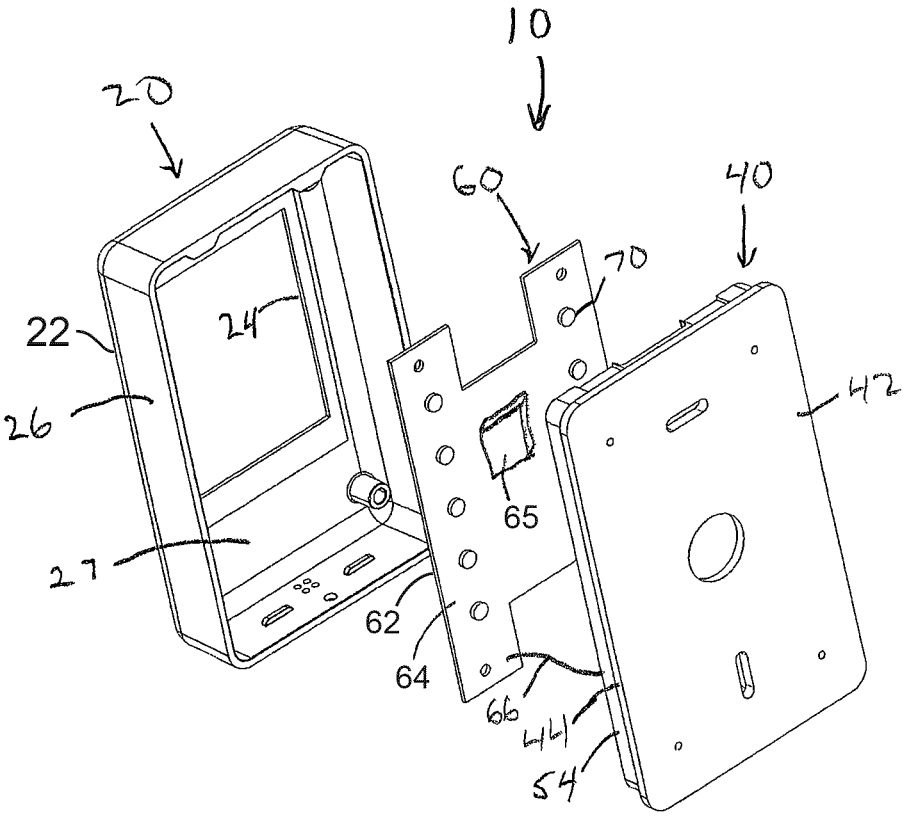
FIG. 1
(Amended)

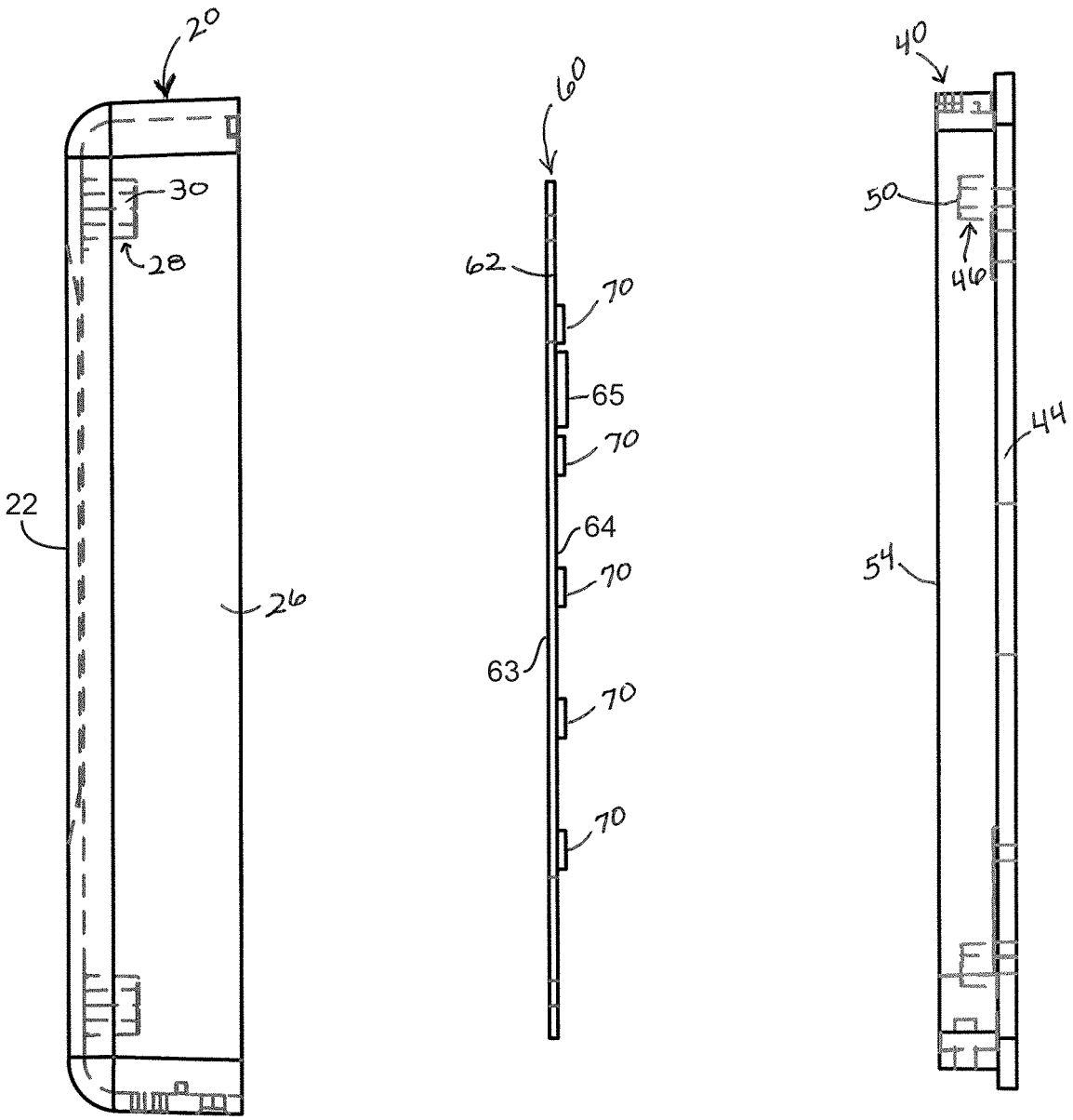
FIG. 2
(Amended)

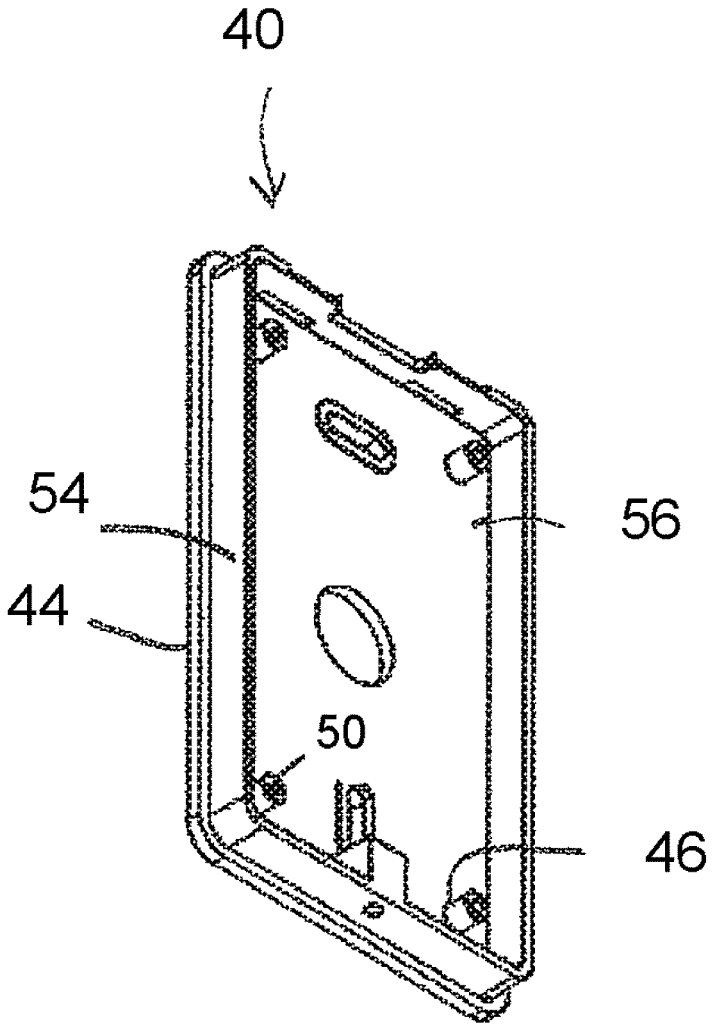
FIG. 3
(Amended)

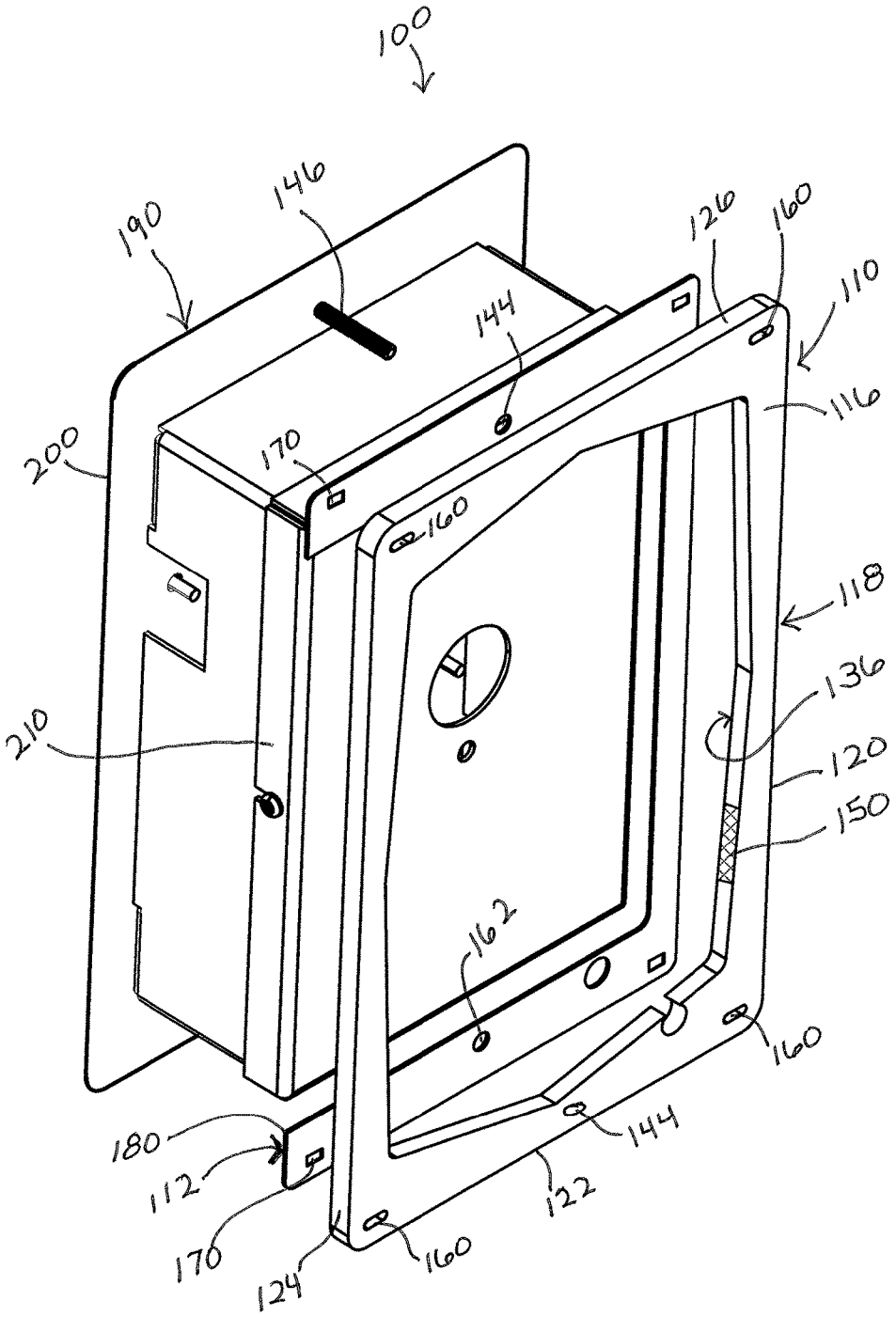
FIG. 4
(Amended)

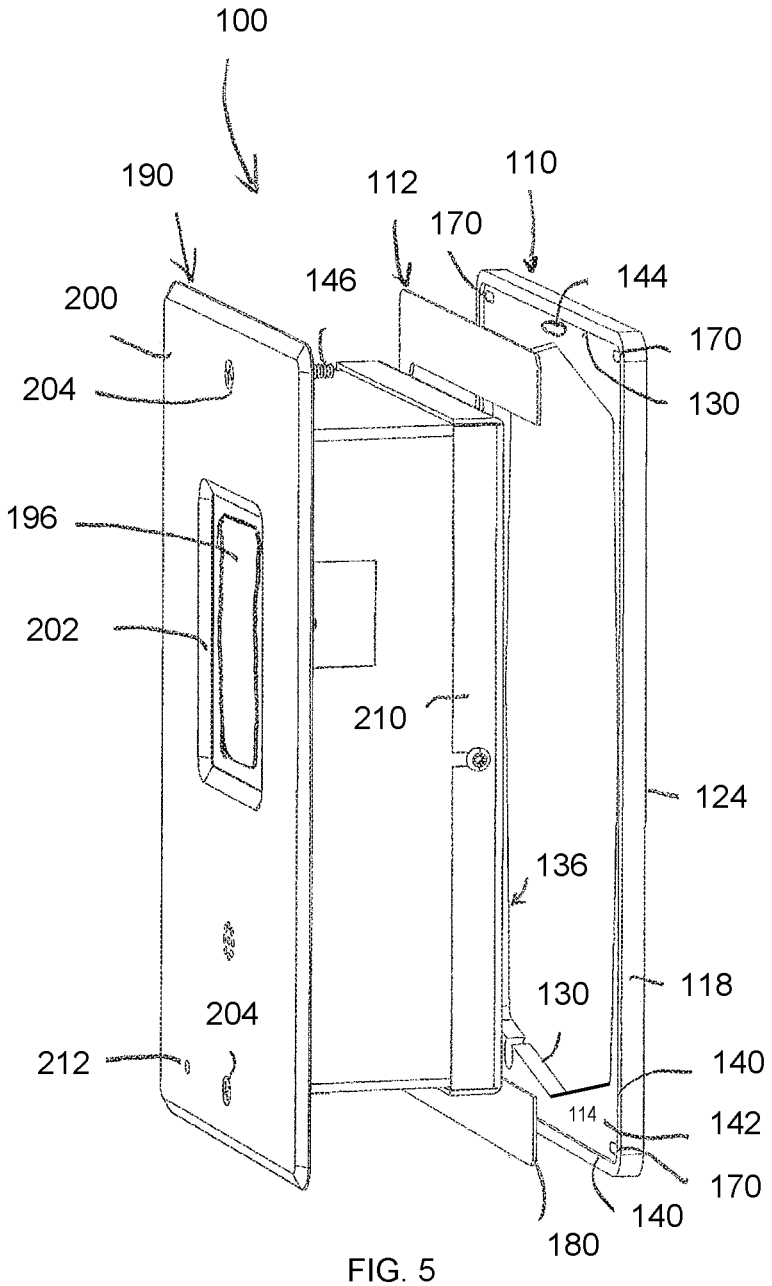
FIG. 5
(Amended)

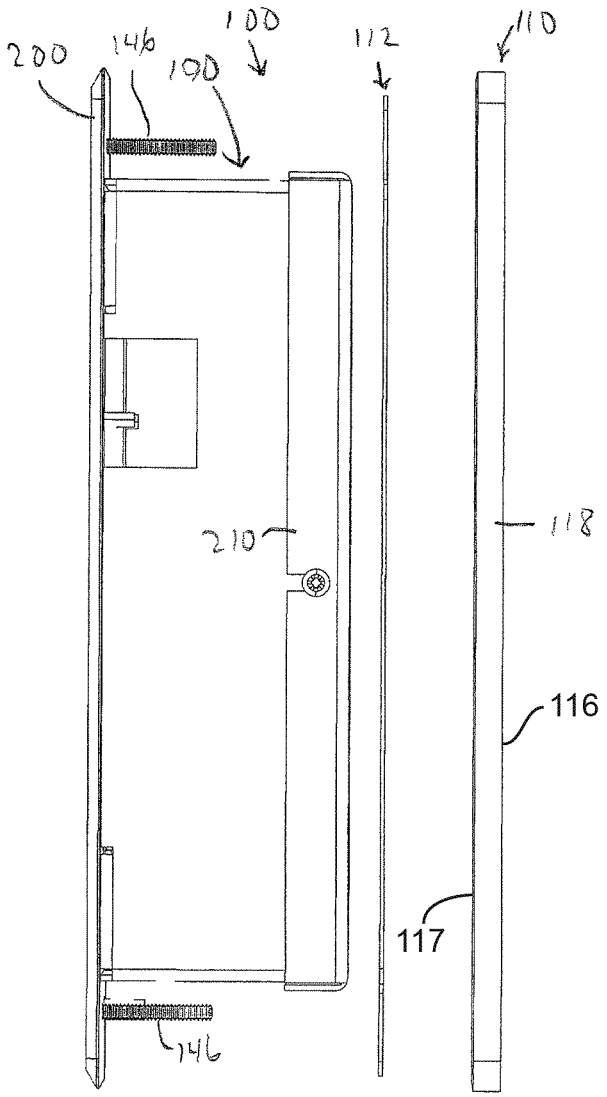
FIG. 6
(Amended)

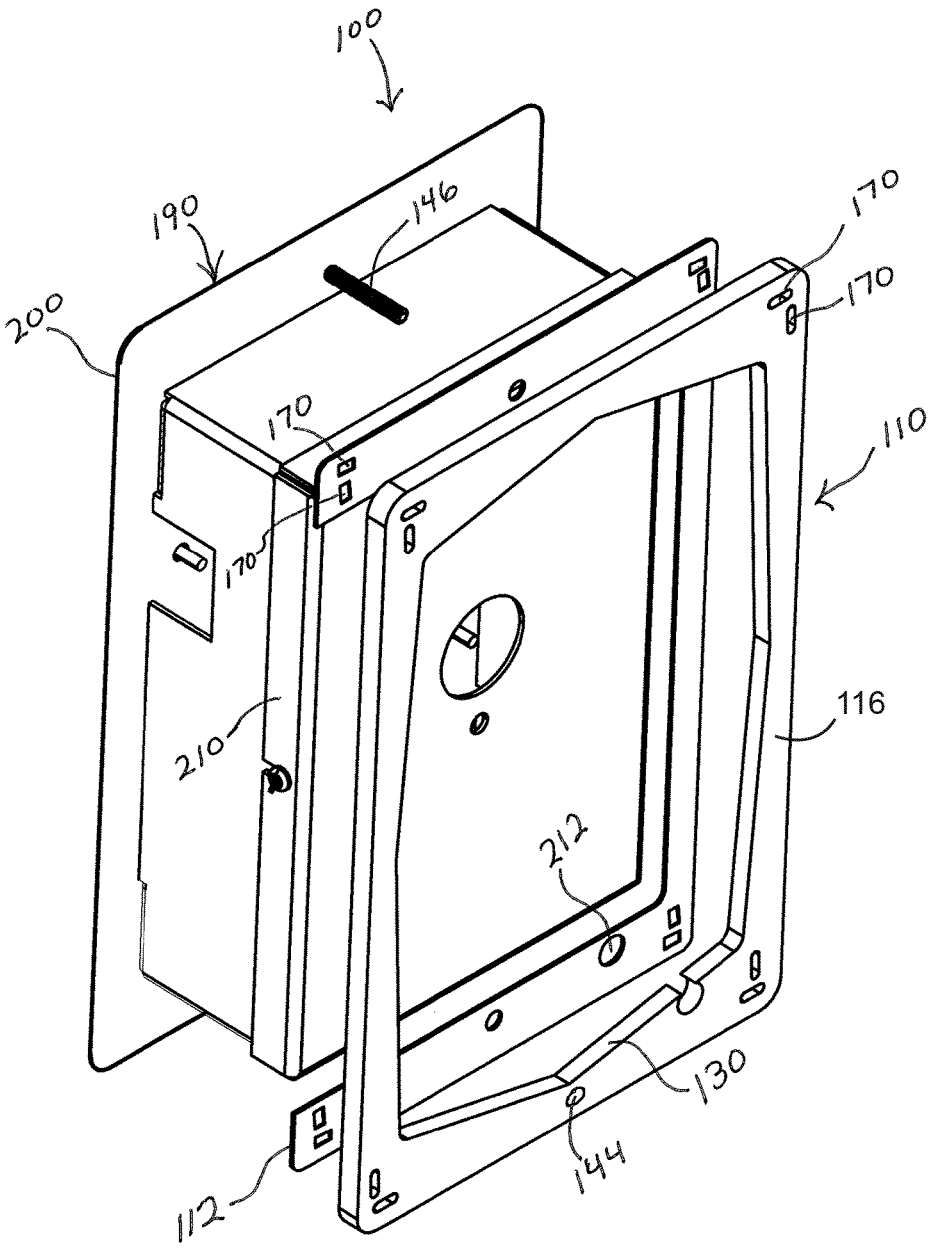
FIG. 7
(Amended)

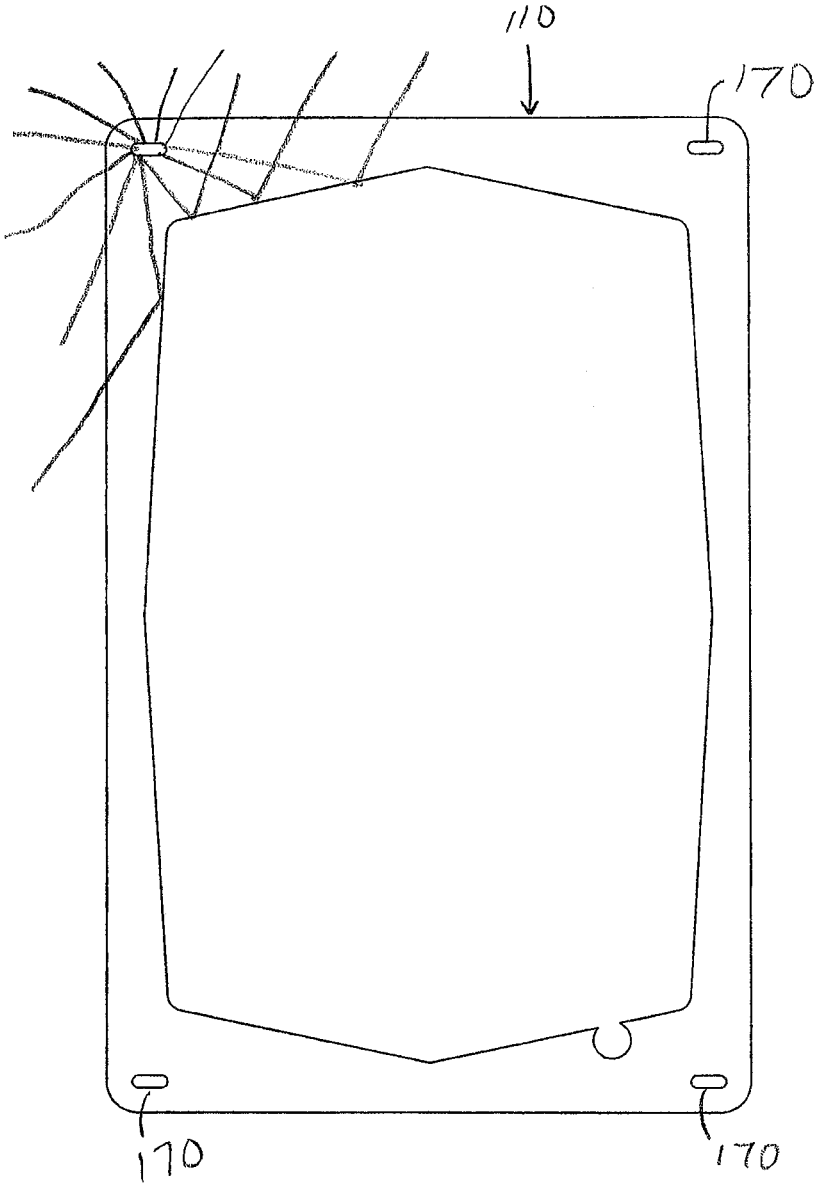
FIG. 8
(Amended)

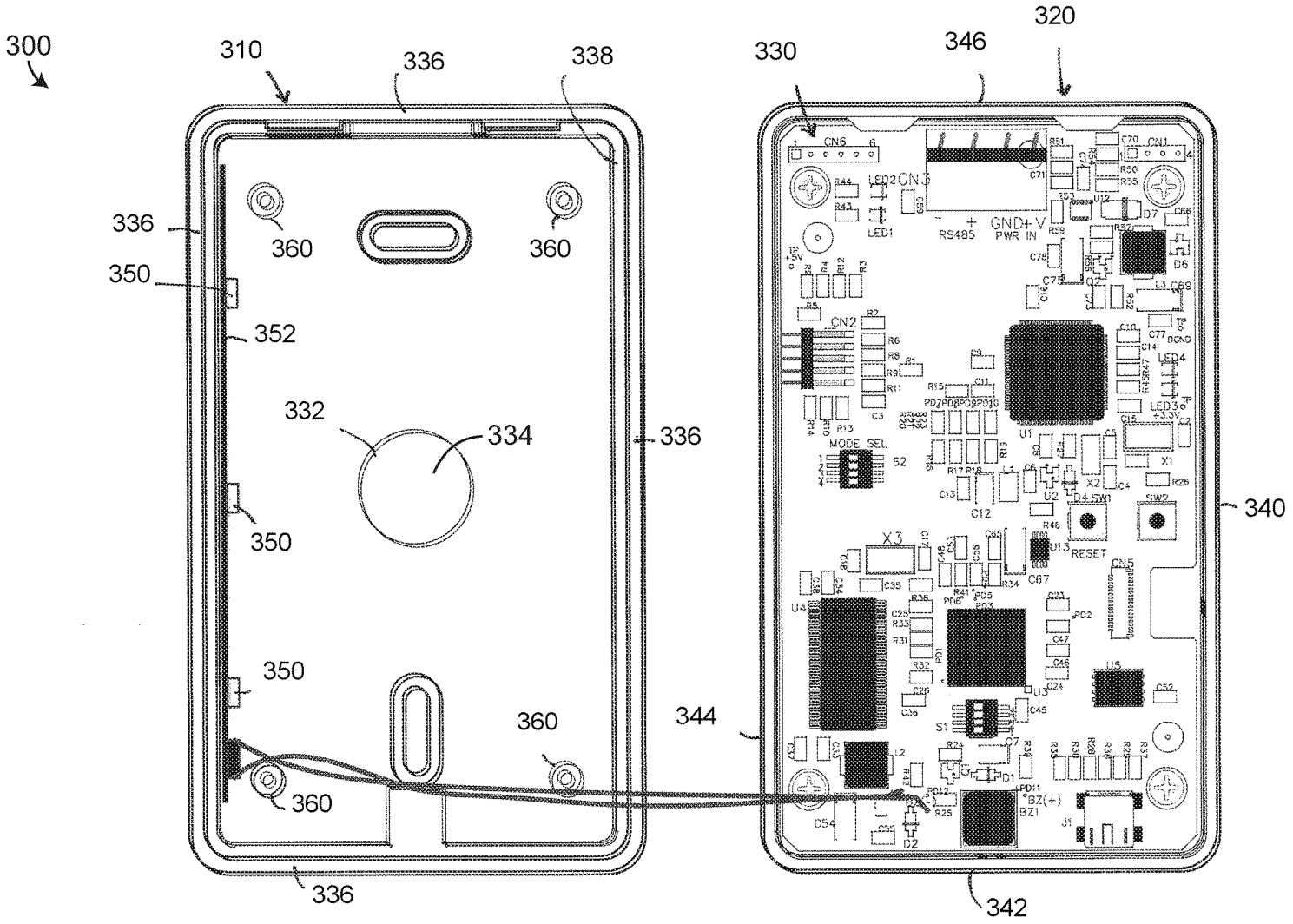
FIG. 9
(Amended)

SIDE VIEWABLE LIGHTED BEZEL FOR A DISPLAY DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

[This application claims benefit of U.S. provisional patent application No. 61/736,218, filed Dec. 12, 2012, entitled SIDE VIEWABLE LIGHTED BEZEL FOR A DISPLAY DEVICE, and commonly assigned to the assignee of the present application, the disclosure of which is incorporated by reference in its entirety herein] *This is a reissue application of U.S. application Ser. No. 14/104,669 filed Dec. 12, 2013, now U.S. Pat. No. 9,824,549 granted Nov. 21, 2017, and which claims benefit of U.S. provisional patent application No. 61/736,218, filed Dec. 12, 2012, the disclosures of which are incorporated by reference in their entireties herein. More than one reissue application has been filed for the reissue of U.S. Pat. No. 9,824,549. The reissue applications are (a) U.S. application Ser. No. 16/505,276 (the present application), (b) U.S. application Ser. No. 16/691,126, filed Nov. 21, 2019, which is a continuation reissue of this application, and (c) U.S. application Ser. No. 17/492,434, filed Oct. 1, 2021, which is a continuation reissue of both (i) the present application and (ii) U.S. application Ser. No. 16/691,126.*

FIELD

The present disclosure relates, in exemplary embodiments, to a lighted wall-mounted display. In exemplary embodiments, the present disclosure relates to wall-mounted lighting panels and face plates for displaying information and alerting observers to changing conditions.

BACKGROUND

Wall-mounted display units, such as monitors and sensors often need to be viewed to determine the status of the systems being monitored or sensed. In many uses the display unit is mounted to a wall in a hallway, such as in a hospital, laboratory, or the like. Typically, a user views the unit by standing or sitting generally in front of the unit so that he or she is looking straight at the display because the illuminated display usually has a limited off-axis viewing angle. For certain types of monitoring, a color change is an adequate signal indicating a change in status. It would be desirable for someone who needs to monitor the display unit to be able to observe a status change (such as a color or light pattern change) or other visual or audible signal) from down a hall where the angle of viewing the display is not straight on at the display unit. It would be desirable to have a display unit that could project a light signal in a wider off-axis viewing angle, such as if a user is positioned in a hallway and views the display unit down the hall from the user's location; i.e., a viewing angle approaching 90 degrees from the aforesaid straight on viewing angle. It would also be desirable for a display unit to be able to illuminate so that the viewing angle can be seen from both off-axis directions, i.e., a total of about 180 degrees, or possibly even more.

SUMMARY

In exemplary embodiments, an apparatus is described for providing side-viewable illumination of a wall-mounted plate, the apparatus comprising a face plate having a face, sides and an opening; a back plate having a front face, rear face and sides, the sides having at least a portion thereof being transparent or translucent; a controller (such as a printed circuit board); and, at least one light-emitting device associated with the back plate rear face and positioned such that light emitted by the light-emitting device at least partially passes through the back plate sides.

In exemplary embodiments, the bezel further includes a display device opening adapted to receive a portion of the display device, the display device opening having an edge that is at least partially coated with a reflective coating such that at least a portion of light from the at least one light-emitting device directed toward the display device opening edge is reflected away from the display device opening edge and back toward the bezel edge.

In other exemplary embodiments, an apparatus is described for providing side-viewable illumination of a wall-mounted plate, the apparatus comprising a face plate having a front face, a rear face, sides, and a display opening; a rear plate adapted to mount either to or within a wall or other structure. Such apparatus further includes a bezel having a front surface, a rear surface, exterior side edges, interior side edges, a rim extending at least partially around the bezel exterior side edges and defining a recess area, and at least one opening extending at least partially through the bezel. The apparatus may further comprise at least one light-emitting device adapted to be received within the bezel opening whereby light emanating from the at least one light-emitting device is at least partially directed toward the bezel side edge such that the light is visible when viewed at an angle generally parallel to or at an acute angle with respect to the plane of front surface of the faceplate. The apparatus may further comprise a controller in electrical communication with the at least one light-emitting device for controlling the at least one light-emitting device.

BRIEF DESCRIPTION OF THE DRAWINGS

The drawings disclose exemplary embodiments, in which like reference characters designate the same or similar parts throughout the figures of which:

FIG. 1 is an exploded perspective view of one exemplary embodiment of an apparatus according to the present disclosure in a surface mount configuration.

FIG. 2 is an exploded side view of the exemplary embodiment of FIG. 1.

FIG. 3 is a perspective view of the back plate of the exemplary embodiment of FIG. 1. FIG. 4 is an exploded rear perspective view of a second exemplary embodiment of an apparatus according to the present disclosure in a flush mount configuration.

FIG. 4 is an exploded rear perspective view of a second exemplary embodiment of an apparatus according to the present disclosure in a flush mount configuration.

FIG. 5 is an exploded front perspective view of a second exemplary embodiment of the exemplary embodiment of FIG. 4.

FIG. 6 is an exploded side view of the exemplary embodiment of FIG. 4.

FIG. 7 is an exploded rear side view of an exemplary embodiment similar to FIG. 4, but incorporating two light-emitting devices on each corner.

FIG. 8 is a schematic view of a bezel showing light emanating from one of the light-emitting devices.

FIG. 9 is a perspective top view of a third exemplary embodiment according to the present disclosure and showing a rear plate having the light-emitting devices mounted to the side edge and also showing a PC board and front plate.

DETAILED DESCRIPTION

FIGS. 1-3 illustrate a first exemplary embodiment of an apparatus 10 of the present disclosure in a surface mount version. The apparatus 10 includes a face plate 20, a back plate 40 and a printed circuit board ("PC board") 60 having light-emitting devices associated therewith.

[The face plate 20 includes a front face 22 having an opening 24 that can accept a display device 80 (as discussed in greater detail hereinbelow). The face plate 20 also has sides 26. In exemplary embodiments, one or more posts 28 may extend from the back side 27 of the face plate 20, such as proximate to the corners, each post 28 having a bore formed therein that may receive a post or fastener 32. The face plate 20 may be made of plastic or any other generally rigid material, such as, but not limited to, ceramic, wood, metal, combinations of the foregoing, or the like.] *The face plate 20 includes a front face 22 having an opening 24 that can accept a display device (as discussed in greater detail hereinbelow). The face plate 20 also has sides 26. In exemplary embodiments, one or more posts 28 may extend from the back side 27 of the face plate 20, such as proximate to the corners, each post 28 having a bore formed therein that may receive a post or fastener. The face plate 20 may be made of plastic or any other generally rigid material, such as, but not limited to, ceramic, wood, metal, combinations of the foregoing, or the like.*

[The back plate 40 is sized to mate with the face plate 20. As shown in FIG. 3, the back plate 40 has a face 42 and edges 44. In exemplary embodiments, the back plate face 42 may have posts 46 extending from the rear surface thereof that can mate with the face plate post bores 30. Alternatively, the back plate face 42 may have holes 50 through which a fastener 52 may be inserted in each and fastened to the mating post 28. In exemplary embodiments, the back plate 40 mates with the face plate 20 and can be retained in position by snap fit or friction fit. In exemplary embodiments the back plate 40 is constructed of a transparent or translucent material, or of a material that has transparent or translucent portions. A rim 54 extending at least partially around the edge 44 of the back plate 40 forms a recess 56 into which the PC board 60 may be fitted. The back plate 40 may have slots or other openings 50 that can accommodate a fastener 52 so as to mount the back plate 40 to a surface, such as, but not limited to, a wall, ceiling, door, other attached structure or a freestanding structure, such as a post on a base.] *The back plate 40 is sized to mate with the face plate 20. As shown in FIG. 3, the back plate 40 has a face 42 and edges 44. In exemplary embodiments, the back plate face 42 may have posts 46 extending from the rear surface thereof that can mate with the face plate post bores 30. Alternatively, the back plate face 42 may have holes 50 through which a fastener may be inserted in each and fastened to the mating post 28. In exemplary embodiments, the back plate 40 mates with the face plate 20 and can be retained in position by snap fit or friction fit. In exemplary embodiments the back plate 40 is constructed of a transparent or translucent material, or of a material that has transparent or translucent portions. A rim 54 extending at least partially around the edge 44 of the back plate 40 forms a recess 56 into which the PC board 60 may be fitted. The back plate 40 may have slots or other openings 50 that can accommodate a fastener so as to mount the back plate 40 to a surface, such as, but not limited to, a wall, ceiling, door, other attached structure or a freestanding structure, such as a post on a base.*

The PC board 60 comprises a generally flat panel 62 with a front surface 63 and a rear surface 64 and has various electronic components, including a controller 65, associated therewith. At least one wire 66 or other electrical connector is electrically connected to the PC board 60. At least one, and, in exemplary embodiments, a plurality of light-emitting devices 70 are mounted to the PC board 60. In exemplary embodiments, the light-emitting devices 70 are mounted to the rear surface 64 of the PC board 60. The light-emitting devices 70 may be laid out in a regular or irregular array or pattern and may be positioned proximate to the edges of the PC board 60, the corners, in the middle or elsewhere. In the exemplary embodiment shown in FIG. 1, the light-emitting devices 70 are laid out in two rows proximate to opposing edges of the PC board 60. In exemplary embodiments, the rear surface 64 of the PC board 60 may be coated with a light reflecting coating, such as, but not limited to, white, light colored, metalicized, mirrored or with other material designed to reflect light.

The light-emitting device 70 may be any suitable light source, including, but not limited to, a light emitting diode ("LED"), organic LED ("OLED"), fiber optic, incandescent, halogen, fluorescent, or the like. In exemplary embodiments, a combination of different types of light-emitting devices may be used. In exemplary embodiments, an LED will be discussed as nonlimiting example of a light-emitting device. In exemplary embodiments, the LED may be an RGB (red-green-blue) LED or may be a single color or white LED. In exemplary embodiments, the light-emitting device 70 may have a translucent colored cover associated therewith. In exemplary embodiments, the light-emitting device 70 may be dimmable.

[The display device 80 is in electrical communication with the controller 64 and may display any of a variety of information, data, conditions, or the like. The display device 80 may be an analog or digital display. In exemplary embodiments, the display device 80 is illuminated. In exemplary embodiments 65, the display device 80 may have a user interface, such as a touch screen.] *The display device is in electrical communication with the controller 64 and may display any of a variety of information, data, conditions, or the like. The display device may be an analog or digital display. In exemplary embodiments, the display device is illuminated. In exemplary embodiments, the display device may have a user interface, such as a touch screen.*

In exemplary embodiments, each light-emitting device 70 has at least one wire 66 connecting it to a controller 65 on the PC board 60. In exemplary embodiments in which RGB LEDs are utilized a wire 66 is used for each of the conventional red, blue, green and power connections.

In exemplary embodiments, the controller 65 is a Triatek model FMS1650-series or FMS1655-series controller, commercially available from Triatek Holdings, LLC (Norcross, Ga., www.triatek.com). The controller 65 can receive information from the user interface. The user interface can be used to program or otherwise instruct the controller 65 to control the light-emitting device 70. In exemplary embodiments, each light-emitting device 70 may be controlled separately.

In exemplary embodiments, the controller 65 includes a processor, analog-to-digital circuitry, digital-to-analog circuitry, serial communications circuitry, status LEDs, and integrated power supply circuitry.

[In exemplary embodiments, the apparatus 10 also includes at least one sensor 90 which may be located proximate to or located remote from the controller 65 and in communication therewith. The PC board 60 may be connected to an AC or other power source. The controller 65 can receive information from the sensors 90. In exemplary embodiments, the sensors 90 can be placed in various parts of a room. The sensors 90 can monitor any number of conditions, such as, but not limited to, air temperature or pressure, humidity, air flow, light level, air quality, room status (occupied or unoccupied), the presence or absence of certain equipment, or the like.] *In exemplary embodiments, the apparatus 10 also includes at least one sensor which may be located proximate to or located remote from the controller 65 and in communication therewith. The PC board 60 may be connected to an AC or other power source. The controller 65 can receive information from the sensors. In exemplary embodiments, the sensors can be placed in various parts of a room. The sensors can monitor any number of conditions, such as, but not limited to, air temperature or pressure, humidity, air flow, light level, air quality, room status (occupied or unoccupied), the presence or absence of certain equipment, or the like.*

In exemplary embodiments, the controller 65 can turn on or off, control brightness, select which color or colors are on or off, activate the light-emitting devices 70 in patterns or control other properties of the light-emitting device 70. In exemplary embodiments, the controller 65 may also include a timer or clock circuit to enable the controller to dim, brighten, flash, or turn on or off the light-emitting device 70 at different times, for example, dimming the light level in the evening. The controller 65 can receive information from the user interface. The user interface can be used to program or otherwise instruct the controller 65 to control the light-emitting device 70. In exemplary embodiments, each light-emitting device 70 may be controlled separately. In exemplary embodiments, the light-emitting devices 70 may be controlled to display a sequenced pattern of light actuation or color. For example, a sequence of flashing lights may indicate an alarm or alert condition warranting immediate attention. In exemplary embodiments, a user can program the controller such that each condition or sensor being monitored can be associated with a uniquely color of light.

In exemplary embodiments, the apparatus 10 may be mounted to a wall, ceiling, doorway, other surface or to a standalone structure. The controller 65 is connected to a power source. In exemplary embodiments, the power source may be an AC source and/or may be a battery or other power source incorporated into the apparatus 10.

In one exemplary embodiment, an apparatus 10 can be used inside a hospital hallway and mounted outside of an isolation room to monitor the status of conditions in the room. The observer can view the display panel straight on (i.e., at an angle range generally perpendicular to the face of the wall) and read the display information. The presently disclosed apparatus provides increased visibility in that the observer can also be down the hall from the apparatus where the display device face is not visible (either due to the observer being off-angle from the viewable angle of face or due to the observer being too far down the hall from the apparatus to make out the display information) and observe various aspects of the room condition (or other aspects being monitored) by the light coming from the apparatus.

[FIGS. 4-6 illustrate an exemplary embodiment of an apparatus 100 that comprises a bezel 110 and a PC board 112. The apparatus 100 is able to mount over or around a conventional circuit box 190 that is associated with a face plate 200. In exemplary embodiments, the bezel 110 may be a generally flat structure with a front surface 112 and a rear surface 116. The bezel 110 has an exterior side edge 118, which includes top 120, bottom 122, left side 124 and right side edge 126 portions. The bezel 110 further has an inside edge 130 forming a central opening 136. The bezel 110 has a rim 140 forming a recessed area 142. The rim 140 may extend all the way around the interior edge 130, or may comprise a plurality of raised sections at various positions around the edge. In exemplary embodiments, the bezel inside edge 130 may have angled or tapered areas which can enhance dispersion of the light. In exemplary embodiments, the bezel edge 130 is generally perpendicular to the front and rear faces. In exemplary embodiments, the bezel interior edge 130 may be beveled or rounded. In exemplary embodiments, the bezel 110 may be generally square or rectangular shaped, or, alternatively, may be triangular, quadrilateral, circular, oval, cloud-shaped or any other regular or irregular shape. In exemplary embodiments, discussed illustratively herein, a rectangular shaped bezel will be referred to as a nonlimiting example.] *FIGS. 4-6 illustrate an exemplary embodiment of an apparatus 100 that comprises a bezel 110 and a PC board 112. The apparatus 100 is able to mount over or around a conventional circuit box 190 that is associated with a face plate 200. In exemplary embodiments, the bezel 110 may be a generally flat structure with a front surface 117 and a rear surface 116. The bezel 110 has an exterior side edge 118, which includes top 120, bottom 122, left side 124 and right side edge 126 portions. The bezel 110 further has an inside edge 130 forming a central opening 136. The bezel 110 has a rim 140 forming a recessed area 142. The rim 140 may extend all the way around the interior edge 130, or may comprise a plurality of raised sections at various positions around the edge. In exemplary embodiments, the bezel inside edge 130 may have angled or tapered areas which can enhance dispersion of the light. In exemplary embodiments, the bezel edge 130 is generally perpendicular to the front and rear faces. In exemplary embodiments, the bezel interior edge 130 may be beveled or rounded. In exemplary embodiments, the bezel 110 may be generally square or rectangular shaped, or, alternatively, may be triangular, quadrilateral, circular, oval, cloud-shaped or any other regular or irregular shape. In exemplary embodiments, discussed illustratively herein, a rectangular shaped bezel will be referred to as a nonlimiting example.*

The bezel 110 may have one or more fastener openings 144 that can accommodate a fastener 146.

In exemplary embodiments, the bezel 110 is made of a generally rigid material, such as, but not limited to, plastic, at least a portion of which is either transparent or translucent. In exemplary embodiments, the bezel 110 may be made of an acrylic material, such as, but not limited to, Plexiglas™ material. In exemplary embodiments, the bezel 110 may be formed of two or more materials, for example, one nontransparent or translucent material forming a main portion, and a transparent or translucent portion surrounding the main portion. The bezel 110 may have uniform translucency or may have a gradient translucency in different areas. In exemplary embodiments, the bezel exterior edge 118 is formed or treated so as to have a frosted or roughened surface so as to diffuse light passing therethrough.

The interior edge 130 of the bezel 110 may have a light reflective material 150 associated with the edge such that at least a portion of the light emitted from a light-emitting device 70 is reflected back from the bezel opening interior edge 130. In exemplary embodiments, the reflective material may be a reflective tape adhered to the bezel opening interior edge 130 or may be a coating applied as a liquid, vapor or solid strip to the edge. In exemplary embodiments, the interior edge 130 can be treated during formation to present a reflective surface.

In one exemplary embodiment, the bezel 110 has at least one opening 160 which may be configured as a slot that can receive at least a portion of a light-emitting device 170 that is mounted to the PC board 112 (as described in further detail hereinbelow).

In exemplary embodiments, each LED opening 160 is located proximate to a corner of the bezel 110. In exemplary embodiments, two or more openings 160 are positioned at each corner, as shown in FIG. 7, each receiving a light-emitting device 170. In other exemplary embodiments, there may be openings 160 at any place along the edge and between the corners that can receive the light-emitting device 170. In exemplary embodiments, each light-emitting device 170 is mounted to distribute light generally along the adjacent bezel edges and outward beyond the edges, as shown in FIG. 8. In exemplary embodiments, the light-emitting device 170 may have at least one lens (not shown) associated therewith for directing, focusing, dispersing, dividing, diffusing, reflecting or otherwise changing the quantity, quality, pattern, or direction of the emitted light.

The PC board 112 may comprise a thin flat sheet with various components associated therewith. The components may be similar to those as described hereinabove for the PC board 60. The PC board 112 is formed so that the exterior edge 180 of the PC board 112 can fit inside the recessed area 112 of the bezel 110. In exemplary embodiments, the PC board 112 may be formed in a C-shape. Light-emitting devices 170 are mounted to the PC board at various locations that match with the LED openings 160 in the bezel 110. When the PC board 112 is inserted in the recessed area 142 in the bezel 110, each light-emitting device 170 is at least partially inserted within the mating opening 160 in the bezel 110. The PC board 112 may have fastener openings 162.

[In exemplary embodiments, a circuitry box 190 may be a conventional electrical box that may contain a controller 192, at least one sensor 194, a display device 196 and a face plate 200. A face plate 200 is a generally flat plate having an opening 202 to accommodate a display device 196. The face plate 200 may have one or more fastener openings 204 that can each accommodate a fastener 146, such as, but not limited to, a screw, bolt, rod, pin or the like. The side edges of the face plate 200 may be square or beveled. The display device 196 may be accessible through the opening 202 in the face plate 200. In exemplary embodiments a back cover 210 may be fastened to the circuitry box 190. In exemplary embodiments, a sensor 194 may be a differential pressure reference sensor, with a port 212 formed in the face plate 200.] *In exemplary embodiments, a circuitry box 190 may be a conventional electrical box that may contain a controller, at least one sensor, a display device 196 and a face plate 200. A face plate 200 is a generally flat plate having an opening 202 to accommodate a display device 196. The face plate 200 may have one or more fastener openings 204 that can each accommodate a fastener 146, such as, but not limited to, a screw, bolt, rod, pin or the like. The side edges of the face plate 200 may be square or beveled. The display device 196 may be accessible through the opening 202 in the face plate 200. In exemplary embodiments a back cover 210 may be fastened to the circuitry box 190. In exemplary embodiments, a sensor may be a differential pressure reference sensor, with a port 212 formed in the face plate 200.*

The bezel 110 (with the PC board 112 inserted into the recessed area 142) is slid over the circuitry box 190 so that the circuitry box fits within the bezel central opening 136. Fasteners 146 may be inserted in the fastener openings 204 in the face plate 200 and through fastener openings 204 in the PC board 112 and the bezel 110 to attach to a mounting plate or box associated with a wall. The PC board 112 is electrically wired to the circuit box 190.

When activated the light-emitting device 170 directs light, at least in part, toward the exterior edges 118 of the bezel 110. Light directed toward the interior edge 130 of the bezel 110 is, at least in part, reflected back outward by the reflective material 150 on the interior edge 130. At least a portion of the light is generally directed from the bezel edge 130 in a pattern that is generally parallel to the face plate 200 and the wall or other structure. The exterior edge 118 of the bezel 110 may be frosted to disperse light, In this manner the light can be viewed at angles approaching and/or parallel to the face plate 200, such as when an observer is away (e.g., down a hall) from the apparatus and not observing the face plate at an angle perpendicular to the face plate. In exemplary embodiments, the light emitted will reflect off the wall or other surface to which the apparatus 100 is mounted, casting a glow around the apparatus and allowing it to be seen from essentially all viewing angles, for example, up to about 180 degrees. In exemplary embodiments, viewing angles of greater than 180 degrees are possible, such as where the apparatus is mounted on an angle on or in a corner edge of a wall, thus enabling viewing down two hallways that are at generally right angles to each other.

FIG. 9 illustrates an exemplary embodiment of an apparatus 300 in an alternative surface mount configuration. The apparatus 300 has a face plate 310, a mating back plate 320, and a PC board 330. The PC board may be as described hereinabove for PC board 60.

[The face plate 310 may have an opening 332 to accommodate a display device 334, the display device 334 being as described hereinabove for display device 80. The face plate 310 has sides 336 that form a recess 338 that can accommodate the PC board 330.] *The face plate 310 may have an opening 332 to accommodate a display device 334, the display device 334 being as described hereinabove for display device. The face plate 310 has sides 336 that form a recess 338 that can accommodate the PC board 330.*

The back plate 320 has top, bottom, left and right sides 340, 342, 344 and 346 that are made of a transparent or translucent material. At least one, and, in exemplary embodiments, a plurality of, light-emitting devices 350, such as, but not limited to, LEDs, are mounted to or associated with at least one of the back plate sides. In exemplary embodiments, the LEDs may on a strip of material and be electrically connected to a controller on the PC board 330. FIG. 9 shows an LED strip 352 attached to side 340. In exemplary embodiments a diffuser, such as, but not limited to, a strip or strips of light diffusing material, may be placed between the LEDs and the back plate side so as to increase diffusion of the light (which can create a more uniform lighting along the back plate side). The diffuser may be plastic or other material. In alternative exemplary embodiments, the back plate sides may have openings formed therein and an LED may be at least partially inserted into the opening, such as through the interior side so as to be either flush with the exterior side or extend partially out of the side. In such an embodiment the back plate 320 may alternatively be made of an opaque material. The back plate 320 may have slots or other fastener openings 360 that can accommodate a fastener so as to mount the back plate to a surface, such as, but not limited to, a wall, ceiling, door, other attached structure or a freestanding structure, such as a post on a base. The back plate 320 mates with the face plate 310 and can be retained in position by snap fit, friction fit, fasteners, or the like.

[FIG. 10 shows an exemplary embodiment of an apparatus 400 having a relief portion formed between the wall and the wall-mountable display. Light emitting devices direct light (in whole or in part) against the sides of the wall, thus creating a halo effect and enabling viewing notification status light from the sides of the apparatus.] *In an exemplary embodiment an apparatus has a relief portion formed between the wall and the wall-mountable display. Light emitting devices direct light (in whole or in part) against the sides of the wall, thus creating a halo effect and enabling viewing notification status light from the sides of the apparatus.*

[FIG. 11 shows an exemplary embodiment of an apparatus 500 that is similar to various exemplary embodiments described hereinabove, but also incorporates (in the PC board) a wireless communications means, such as, but not limited to, Bluetooth™, Zigbee™ or other communications protocol now known or developed hereafter. The wireless-enabled apparatus 500 may wirelessly transmit status information to a remote signaling device, such as, but not limited to, a light stack, light tower or other device known to those skilled in the art that can display one or more distinct light colors or other visual or audible status indicators. The apparatus 500 may optionally also incorporate the side-angle viewing structures as discussed hereinabove.] *In an exemplary embodiment an apparatus that is similar to various exemplary embodiments described hereinabove also incorporates (in the PC board) a wireless communications means, such as, but not limited to, Bluetooth™, Zigbee™ or other communications protocol now known or developed hereafter. The wireless-enabled apparatus may wirelessly transmit status information to a remote signaling device, such as, but not limited to, a light stack, light tower or other device known to those skilled in the art that can display one or more distinct light colors or other visual or audible status indicators. The apparatus may optionally also incorporate the side-angle viewing structures as discussed hereinabove.*

In exemplary embodiments, the apparatus as described herein may also include an audible alert, such as an audio speaker or tone generator associated with the PC board that can be actuated when the light-emitting devices are actuated.

For the various exemplary embodiments described herein, the controller can be programmed so that the light-emitting devices are always on and displaying a particular color, such as green, to indicate a normal state. An alert status can be indicated by changing the color, such as to yellow, and causing the light-emitting devices to slowly flash. An alarm status can be indicated by changing the color, such as to red, and causing the light-emitting devices to flash more rapidly.

The present disclosure provides a method of providing a visual alert in response to an environmental condition or change in condition. In exemplary embodiments the method may comprise providing an apparatus according to the present disclosure, positioning at least one sensor in an environmental location to be monitored, such as a room, hall, ventilation hood area, or the like, instructing a controller to determine the initial sensor condition and to receive periodic sensor data. The method further comprises comparing the periodic sensor data with prior sensor data to determine whether the difference in measurements is greater than a predetermined amount. If the predetermined amount is exceeded the controller actuates the LEDs to light in a preset or predetermined pattern, color, or other state so as to provide a visual alert of the change in condition greater than the predetermined amount. The method may also include resetting the controller using the display device interface, for example, once the condition has been changed and the sensor data returns to be less than the amount which caused the alert to be triggered. In exemplary embodiments, the apparatus may be in electrical communication with one or more environmental control apparatus, such as, but not limited to, a thermostat, heat or air conditioning unit, humidifier, or the like. The controller can be instructed by a user or automatically by the controller programming to send a signal to actuate, de-actuate or adjust the environmental control apparatus so as to change the environmental condition. In addition to environmental condition detection sensors, the apparatus may be in electrical communication with other sensors, such as heart monitors, hospital bedside patient monitors, and the like.

In exemplary embodiments, the sensors may communicate with the controller by a wired electrical connection, or may be in wireless communication.

Although only a number of exemplary embodiments have been described in detail above, those skilled in the art will readily appreciate that many modifications are possible in the exemplary embodiments, without materially departing from the novel teachings and advantages. Accordingly, all such modifications are intended to be included within the scope of this disclosure as defined in the following claims.

While the methods, equipment and systems have been described in connection with specific embodiments, it is not intended that the scope be limited to the particular embodiments set forth, as the embodiments herein are intended in all respects to be illustrative rather than restrictive.

As used in the specification and the appended claims, the singular forms "a," "an" and "the" include plural referents unless the context clearly dictates otherwise.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods, equipment and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods, equipment and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

It should further be noted that any patents, applications and publications referred to herein are incorporated by reference in their entirety.

What is claimed is:

1. An apparatus for providing side-viewable illumination of a wall-mounted plate to allow a wider off-axis viewing angle for alerts to changes in a condition being monitored by a sensor, *wherein the condition is a pressure in a room associated with the apparatus,* the apparatus comprising:

a) a face plate having a face, sides and an opening;

b) a back plate having a front face, rear face and sides, the sides having at least a portion thereof being transparent or translucent;

c) a controller;

d) at least one light-emitting device associated with the *rear face of the* back plate [rear face] and positioned such that light emitted by the light-emitting device at least partially passes through the *sides of the* back plate[sides];

e) at least one *pressure* sensor in communication with the controller such that the controller can actuate or change a condition of at least one light-emitting device in response to [the] *pressure* sensor information received by the controller; and wherein the sides allow a wider off-axis viewing angle to see a change in the at least one light-emitting device in response to the *pressure* sensor information, *wherein the light is provided along a left and a right of the apparatus to provide the wider off-axis viewing angle*.

2. The apparatus of claim 1, further comprising an electrical screen in electrical communication with the controller and adapted to at least be partially received within the *opening of the* face plate [opening].

3. The apparatus of claim 2, further comprising means associated with the controller for providing wireless communication.

4. The apparatus of claim 1, wherein the *rear face of the* back plate [rear face] has a reflective material associated therewith.

5. The apparatus of claim 1, further comprising a plurality of fasteners, each fastener adapted to join the face plate to the back plate.

6. The apparatus of claim 1, further comprising a user interface associated with the controller.

7. The apparatus of claim 1, wherein the controller is adapted to actuate the at least one light-emitting device.

8. The apparatus of claim 1, wherein the controller is adapted to control at least one of [the] *an* actuation, brightness, color, sequence or pattern of *the* light emitted from each *of the at least one* light-emitting device.

9. The apparatus of claim 1, wherein the controller further includes timer circuitry so as to dim, brighten or turn on or off the at least one light-emitting device according to at least one preset time interval.

10. The apparatus of claim 1, further comprising means associated with the controller for providing wireless communication.

11. The apparatus of claim 10, further comprising a visual signal projection device that is adapted to be in wireless electronic communication with the controller.

12. An apparatus for providing side-viewable illumination of a wall-mounted plate to allow a wider off-axis viewing angle for alerts to changes in a condition being monitored by a sensor, the apparatus comprising:

a) a face plate having a front face, a rear face, sides, and a display opening;

b) a rear plate adapted to mount either to or within a wall or other structure;

c) a bezel having i) a front surface, ii) a rear surface, iii) exterior side edges, iv) interior side edges, v) a rim extending at least partially around the *exterior side edges of the* bezel [exterior side edges] and defining a recessed area, and vi) at least one opening extending at least partially through the bezel;

d) at least one light-emitting device adapted to be received within the [bezel] *at least one* opening *of the bezel* whereby light emanating from the at least one light-emitting device is at least partially directed toward [the] *a* bezel side edge such that the light is visible when viewed at an angle generally parallel to or at an acute angle with respect to [the] *a* plane of *a* front surface of the [faceplate] *face plate*;

e) a controller in electrical communication with the at least one light-emitting device for controlling the at least one light-emitting device;

f) at least one sensor in communication with the controller such that the controller can actuate or change a condition of at least one light-emitting device in response to [the] sensor information received by the controller; and wherein the bezel allows a wider off-axis viewing angle to see a change in the at least one light-emitting device in response to the sensor information.

13. The apparatus of claim 12, wherein the face plate further comprises an electrical screen in electrical communication with the controller.

14. The apparatus of claim 12, wherein the bezel *side* edge has a surface that can transmit *the* light in a diffused manner.

15. The apparatus of claim 12, wherein the bezel *side* edge has a surface that is frosted.

16. The apparatus of claim 12, wherein the bezel is generally rectangular or square and has four corners, wherein a light-emitting device is disposed proximate to each corner.

17. The apparatus of claim 12, wherein the at least one light-emitting device is at least one light-emitting diode ("LED").

18. The apparatus of claim 17, wherein the LED is an RGB LED.

19. The apparatus of claim 12, wherein the bezel further includes a display device and a display device opening adapted to receive a portion of the display device, the display device opening having an edge that is at least partially coated with a reflective coating such that at least a portion of light from the at least one light-emitting device directed toward the *edge of the* display device opening [edge] is reflected away from the *edge of the* display device opening [edge] and back toward the bezel edge.

20. A method of visual alert in response to an environmental condition or change in condition to allow a wider off-axis viewing angle to changes in a condition being monitored, the method comprising:

a) providing an apparatus according to claim 1;

b) positioning *the* at least one sensor in an environmental location to be monitored;

c) instructing [a] *the* controller to determine [the] *an* initial condition of the sensor and to receive periodic sensor data;

d) comparing the periodic sensor data with prior sensor data to determine whether the difference in measurements is greater than a predetermined amount;

e) when the predetermined amount is exceeded, actuating [a light emitting device] *the light-emitting device* to light in either a predetermined pattern, color, or other state so as to provide a visual alert; and wherein the apparatus allows [a] *the* wider off-axis viewing angle to see a change in the at least one light-emitting device in response to the predetermined amount being exceeded.

21. The method of claim 20, further comprising resetting the controller using [the] *a* display device interface, once at least one subsequent measurement after step e) is less than the predetermined amount.

22. The apparatus of claim 20, further comprising a visual signal projection device that is adapted to be in wireless electronic communication with the controller.

*23. An apparatus for providing side-viewable illumination to allow a wider off-axis viewing angle for alerts to changes in a condition being monitored by a sensor, the apparatus comprising:*

*a) a face plate;*

*b) a back plate;*

*c) sides between the face plate and the back plate configured to allow light to pass through;*

*d) a controller;*

*e) at least one light-emitting device positioned such that light emitted by the at least one light-emitting device can be viewed through at least the sides;*

*wherein the controller is in communication with at least one pressure sensor such that the controller can actuate or change a condition of the at least one light-emitting device in response to pressure sensor information received by the controller; and*

*wherein the sides allow a wider off-axis viewing angle to see a change in the at least one light-emitting device, the change in the at least one light-emitting device indicating a change in the pressure sensor information, wherein the condition is a pressure in a room associated with the apparatus.*

*24. The apparatus of claim 23, further comprising an electrical screen in electrical communication with the controller and adapted to at least be partially received within an opening of the face plate.*

*25. The apparatus of claim 24, wherein the controller further comprises a wireless radio and is configured to wirelessly communicate status information.*

*26. The apparatus of claim 23, wherein a rear face of the back plate has a reflective material associated therewith.*

*27. The apparatus of claim 23, wherein the controller further comprises a wireless radio and is configured to wirelessly communicate status information.*

*28. An apparatus for providing side-viewable illumination to allow a wider off-axis viewing angle for alerts to changes in a condition being monitored by a sensor, the apparatus comprising:*

*a) a face plate;*

*b) a rear plate;*

*c) sides configured to allow light to pass through;*

*d) a bezel having*

*i) a front surface,*

*ii) a rear surface,*

*iii) exterior side edges,*

*iv) interior side edges,*

*v) a rim extending at least partially around the exterior side edges of the bezel and defining a recessed area, and*

*vi) at least one opening extending at least partially through the bezel;*

*e) at least one light-emitting device adapted to be received within the at least one opening of the bezel whereby light emanating from the at least one light-emitting device is at least partially directed toward the exterior side edges such that the light is visible when viewed at an angle generally parallel to or at an acute angle with respect to a plane of the front surface of the face plate;*

*f) a controller in electrical communication with the at least one light-emitting device for controlling the at least one light-emitting device and the controller being in communication with at least one sensor such that the controller can actuate or change a condition of the at least one light-emitting device in response to sensor information received by the controller; and*

*wherein the bezel allows a wider off-axis viewing angle to see a change in the at least one light-emitting device in response to the sensor information.*

*29. The apparatus of claim 23, wherein the apparatus is configured for mounting on a surface, wherein the surface is a wall associated with the room.*

*30. The apparatus of claim 23, further comprising a display screen, and wherein the sides comprise a left side and a right side and the light is provided along and from the left side and the right side to provide the wider off-axis viewing angle.*

*31. The apparatus of claim 30, wherein the display screen comprises a touch screen.*

*32. The apparatus of claim 30, wherein the display screen is viewable through an opening in the face plate.*

*33. The apparatus of claim 23, wherein a color of light emitted by the at least one light-emitting device indicates an alarm status.*

*34. The apparatus of claim 33, wherein the color comprises one of a green color, a yellow color, or a red color to indicate the alarm status.*

*35. The apparatus of claim 34, wherein the color is transitionable between the green color, the yellow color, and the red color to indicate changes of the alarm status.*

*36. The apparatus of claim 30, wherein the display screen is configured to display a pressure condition.*

*37. The apparatus of claim 30, wherein the display screen provides textual information indicative of the pressure sensor information.*

*38. The apparatus of claim 37, wherein the pressure sensor information comprises a differential pressure and the apparatus further comprises a user interface configured to program the apparatus.*

*39. The apparatus of claim 23, further comprising a circuit board having a notch.*

*40. The apparatus of claim 39, wherein the at least one light-emitting device comprises a plurality of light-emitting devices in a first array of first light-emitting devices and a second array of second light-emitting devices, wherein the controller is positioned beneath the notch and between the first array of the first light-emitting devices and the second array of the second light-emitting devices.*

*41. The apparatus of claim 39, wherein the back plate comprises a slot located near the notch.*

*42. The apparatus of claim 39, wherein the circuit board comprises a plurality of screw holes each positioned at*

*corners of the circuit board and the face plate comprises a plurality of receptacles corresponding to the plurality of screw holes.*

*43. The apparatus of claim 23, wherein the back plate comprises a rim.*

*44. The apparatus of claim 23, wherein the back plate comprises a hole for receiving a fastener.*

*45. The apparatus of claim 44, wherein the back plate comprises a notch opposite the hole.*

*46. The apparatus of claim 23, wherein the back plate comprises a plurality of openings.*

*47. The apparatus of claim 23, wherein the back plate is configured to snap fit or friction fit with the sides.*

*48. The apparatus of claim 23, wherein the face plate and the sides are integrally formed.*

*49. The apparatus of claim 23, wherein the face plate is plastic.*

*50. The apparatus of claim 23, wherein the at least one light-emitting device comprises a plurality of light-emitting devices, the plurality of light-emitting devices positioned in an array.*

*51. The apparatus of claim 50, wherein the array extends in a direction parallel with the sides.*

*52. The apparatus of claim 50, wherein the plurality of light-emitting devices comprises at least four light-emitting devices.*

*53. The apparatus of claim 23, wherein the at least one light-emitting device comprises a plurality of light-emitting devices in a first array of first light-emitting devices and a second array of second light-emitting devices, wherein the first array of first light-emitting devices is linearly positioned on a circuit board along a first side of the sides and the second array of second light-emitting devices is linearly positioned on the circuit board along a second side of the sides, wherein the first side is opposite the second side.*

*54. The apparatus of claim 23, wherein the at least one light-emitting device is configured to emit light viewable through at least the sides through a strip of diffusing material disposed near the at least one light-emitting device.*

*55. The apparatus of claim 23, wherein the face plate comprises a rectangular opening for receiving a display.*

*56. The apparatus of claim 23, wherein the at least one light-emitting device is provided on a circuit board, wherein the circuit board comprises a light reflective material provided on a surface of the circuit board near the at least one light-emitting device.*

*57. The apparatus of claim 23, wherein the at least one light-emitting device is provided on a first circuit board, and the controller is provided closer to the face plate than the first circuit board.*

*58. The apparatus of claim 23, wherein the apparatus is configured to provide an alert in response to a change in a condition of an isolation room.*

*59. The apparatus of claim 23, wherein the controller is provided on a first circuit board, and wherein the apparatus further comprises a second circuit board, wherein the first circuit board and the second circuit board are positioned within the face plate, the sides, and the back plate.*

*60. The apparatus of claim 23, further comprising a plurality of fasteners, each fastener adapted to join the face plate to the back plate.*

*61. The apparatus of claim 23, wherein the controller is adapted to control color of the light emitted from each of the at least one light-emitting device.*

*62. The apparatus of claim 23, wherein the controller further includes timer circuitry so as to dim, brighten or turn on or off the at least one light-emitting device according to at least one preset time interval.*

*63. The apparatus of claim 23, wherein the at least one light-emitting device is at least one light-emitting diode ("LED").*

*64. The apparatus of claim 63, wherein the LED is an RGB LED.*

*65. The apparatus of claim 23, wherein the at least one light-emitting device comprises a plurality of light-emitting devices and further comprising a diffuser positioned between at least one of the light-emitting devices and the sides and configured to increase a diffusion light emitted by at least one of the light-emitting devices.*

*66. The apparatus of claim 23, wherein the sides are a left side and a right side wherein the apparatus has a rectangular shape and has a height greater than a width between the left side and the right side, the height being in a vertical direction.*

*67. The apparatus of claim 23, wherein a color of light emitted by the at least one light-emitting device comprises a green color to indicate a first condition, a yellow color to indicate a second condition, or a red color to indicate a third condition.*

*68. The apparatus of claim 67, further comprising an electrical screen in electrical communication with the controller and adapted to at least be partially received within an opening of the face plate, wherein the electrical screen is a digital display and pressure information is displayed on the display, and wherein the electrical screen can be used to program the color.*

*69. The apparatus of claim 23, further comprising a circuit board having a first cut away portion and a second cut away portion, wherein the at least one light-emitting device comprises a plurality of light-emitting devices in a first array of first light-emitting devices and a second array of second light-emitting devices, wherein the controller is positioned beneath the first cut away portion and the second cut away portion and between the first array of the first light-emitting devices and the second array of the second light-emitting devices, wherein the circuit board is configured to have a first leg and a second leg, the first cut away portion being disposed between the first leg and the second leg.*

*70. The apparatus of claim 23, further comprising a circuit board, wherein the at least one light-emitting device comprises a plurality of light-emitting devices in a first array of first light-emitting devices and a second array of second light-emitting devices are disposed on the circuit board and a strip of material is disposed between the side and at least one of the first array and the second array.*

*71. The apparatus of claim 23, further comprising a circuit board, a first strip of non-opaque material, and a second strip of non-opaque material, and wherein the sides comprise a first side and a second side opposite the first side, wherein the at least one light-emitting device comprises a plurality of light-emitting devices in a first array of first light-emitting devices and a second array of second light-emitting devices are disposed on the circuit board, and wherein the first strip of non-opaque material is disposed between the first side and the first array and the second strip of non-opaque material is disposed between the second side and the second array.*

*72. The apparatus of claim 71, wherein the first strip of non-opaque material and the second strip of non-opaque material are diffusers.*

*73. The apparatus of claim 23, wherein the back plate comprises a rim extending around an edge of a surface, the rim defining a recess configured for reception of a circuit board.*

*74. The apparatus of claim 23, further comprising a circuit board having a first cut away portion and a second cut away portion, wherein the at least one light-emitting device comprises a plurality of light-emitting devices in a first array of first light-emitting devices and a second array of second light-emitting devices, wherein the controller is positioned beneath the first cut away portion and second cut away portion and between the first array of the first light-emitting devices and the second array of the second light-emitting devices, wherein the back plate has a first slot above the first cut away portion and a second slot above the second cut away portion.*

*75. The apparatus of claim 74, wherein the first slot is horizontal and the second slot is vertical.*

*76. The apparatus of claim 75, wherein the back plate has an aperture between the first slot and the second slot.*

*77. The apparatus of claim 23, further comprising a speaker for providing an audio alert in response to the sensor information.*

*78. The apparatus of claim 23, wherein the at least one light-emitting device comprises a plurality of light-emitting devices, wherein the plurality of light-emitting devices comprises at least four light-emitting devices.*

*79. The apparatus of claim 23, wherein the apparatus is configured to provide an alert to a change in a condition of an isolation room.*

*80. The apparatus of claim 24, wherein the electrical screen is a digital display and pressure information is displayed on the display, and wherein the electrical screen can be used to select a color.*

*81. The apparatus of claim 23, wherein the apparatus is configured to provide the light so that the light can be viewed across viewing angles of 180 degrees.*

*82. The apparatus of claim 23, further comprising a touch screen and display and adapted to at least be partially received within an opening of the face plate, wherein the face plate and the opening of the face plate are rectangular and a top surface face plate defines a border around the opening.*

*83. The apparatus of claim 23, wherein the sides are integral with the face plate.*

*84. The apparatus of claim 23, wherein the pressure sensor is a differential pressure remote from the controller.*

* * * * *